Patented May 7, 1946

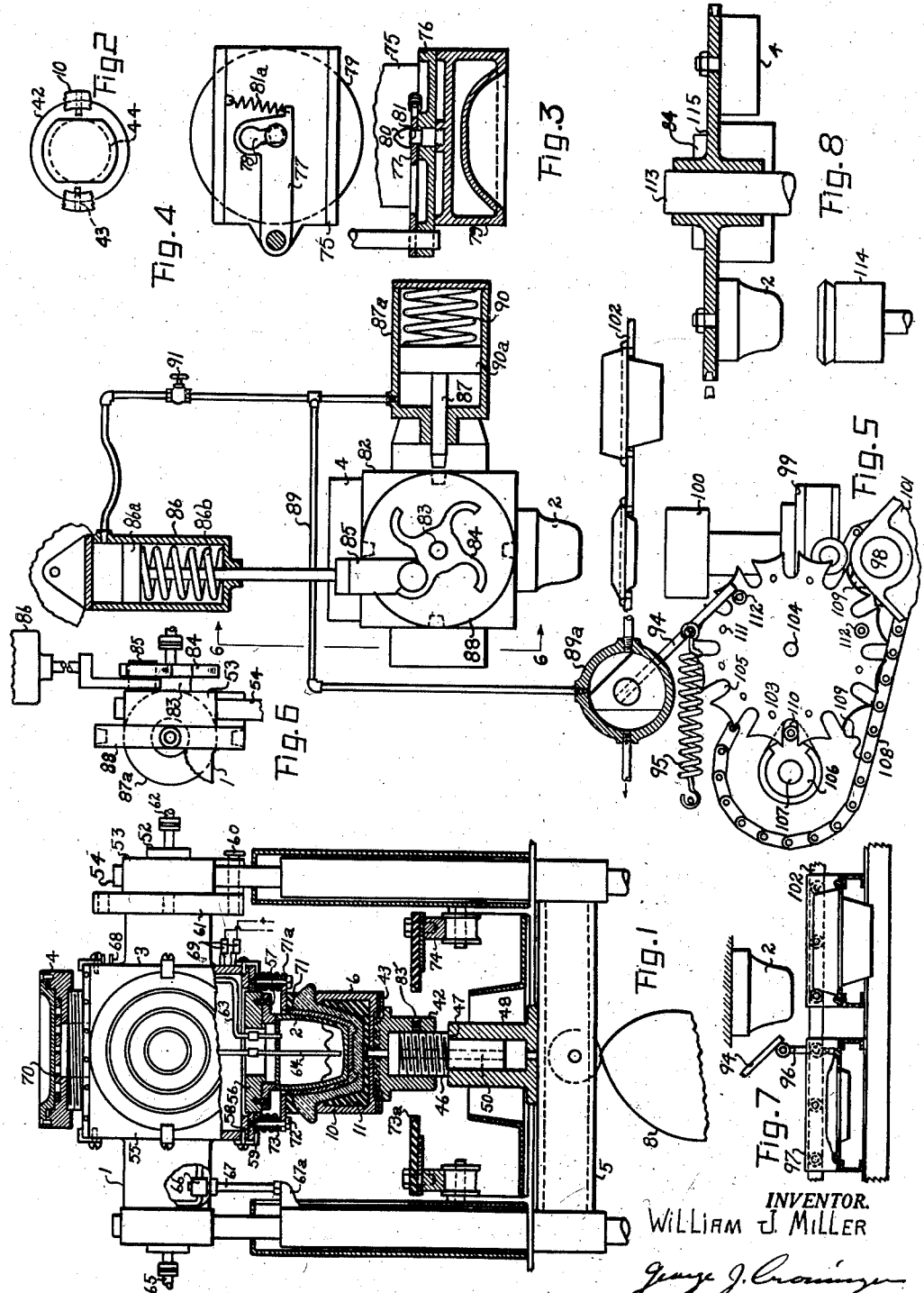

2,399,689

UNITED STATES PATENT OFFICE 2,399,689

POTTERY MACHINE

William J. Miller, Swissvale, Pa., assignor to Miller Pottery Engineering Company, Swissvale, Pa., a corporation of Pennsylvania Application January 15, 1940, Serial No. 313,861

8 Claims. (Cl. 25—22)

This invention relates to the manufacture of articles of pottery ware from plastic ceramic materials, particularly vitreous and semi-vitreous ware and earthen ware in such shapes as plates, cups and saucers, bowls and the like.

This application is a continuation in part of my co-pending application for United States Letters Patent, Serial No. 205,711.

In the manufacture of pottery ware according to the teachings of my Reissue Patent #20,-401, the method is to automatically feed measured charges of clay to absorbent molds constructed of plaster and bond the clay to the mold and thereafter jigger it. The step of preforming is preferably accomplished by pressing the charge of the clay between the mold and a matrix, the clay flowing over and completely covering the molding surface to a depth greater than in the finished piece, the excess being removed by the profile.

One object of this invention is to provide for rapid and automatic exchange of preforming instrumentalities in correct working position, without interrupting production; another object is to selectively enable each exchange after a predetermined number of pieces of ware in each shape has been produced.

The invention comprehends the combining of a press as herein disclosed with either feeding or jiggering mechanism or both in a single unit or the press may be set up and operated alone.

One advantageous feature is that the different pieces in a tableware set may be made at high speed, in succession and with a single unitary apparatus. Another advantageous feature is that manual intervention is eliminated entirely or considerably minimized and speeded up in the matter of exchanging preforming implements in working position. Still another advantageous feature is that the operating mechanism is simple and fool proof. It is particularly advantageous for small size potteries or potteries catering to small lot diversified shape production such as hotel dinnerware and high quality vitrified dinnerware.

In the drawing,

Fig. 1 is a sectional elevation of a preforming machine mounting a plurality of diversified preforming implements which are exchanged manually.

Fig. 2 is a top plan view of a bayonet type locking mounting for the press mold chuck of Fig. 1.

Figs. 3 and 4 illustrate respectively a cross section and top plan view of a preforming die and releasable securing mechanism whereby said die may be quickly and easily removed and exchanged by hand.

Fig. 5 is a view with certain of the parts in section of a plural head preformer support and mechanism for automatically exchanging preforming implements in the working position.

Fig. 6 is an end view looking in the direction of line 6—6 of Fig. 5.

Fig. 7 is a detail illustrating how the operation of the actuating mechanism for the apparatus of Fig. 5 may be controlled by the mold conveyor.

Fig. 8 is a detail partly in section disclosing means for supporting the preforming implements for horizontal movement into the working position.

With reference to Fig. 1, the preforming apparatus disclosed therein is for the manual exchange of preforming implements at the working position and comprises, generally, a rotatable turret 1 on which a multiple of diverse hollow ware and flat ware preforming implements in the form of dies 2, 3 and 4 are mounted, said dies having molding surfaces reversely contoured to that of the mold adapted to co-operate therewith. These dies are alterable at the working position and are adapted to co-operate with molds supported by a chuck 6 which is adjustably and removably secured to a pedestal secured to a vertically reciprocable crosshead 5 raised and lowered by a cam 8.

The mold chuck 6 is constructed according to teachings of my co-pending application, Serial No. 205,711, being adapted to support and reinforce the mold during periods of applied pressure. Said chuck comprises a rigid shell 10 having a liner 11 composed of a material as specified in my application just mentioned, said material being molded to the shape of the side and bottom of the mold but sufficiently oversize to enable easy insertion and withdrawal of the mold. When pressure is applied, the material, which is confined to the rigid shell 10, swells out in the zone of the side wall of the mold and intimately engages the same. Rubber is a suitable material.

The chuck 6 has a socketed base provided with radial lugs 43 extending into the socket portion. These lugs form one part of a bayonet type lock by means of which the chuck is secured to the head of a sleeve 42. The head of the sleeve is cut away at opposite sides to allow the lugs to fit on over the head, there being undercut grooves 44 into which the lugs pass upon rotation of the chuck a quarter turn in either direction to thereby secure the chuck in place. The sleeve 42 is threaded onto a shouldered stem 46 which fits into the bore of a pedestal 48 mounted on the crosshead 5, a shoulder 47 positioning the altitude. A set screw 83' prevents accidental displacement of the adjusted position of the sleeve 42.

With the arrangement just described, chucks may be quickly and easily replaced either by removing the entire assembly from the pedestal or by detaching the chuck 6 and exchanging it for another. If the adjustment of parts of the assembly is not disturbed when removed from the pedestal 48, it may be replaced at any subsequent turn without need for resetting. Several of these units may be kept on hand, each preadjusted, to fit and support in the proper elevation various types of molds.

A suction duct 50 is provided to apply suction to the mold to insure reliable gripping thereof in the chuck when the mold and clay blank are parted from the die. The duct 50 may be connected to a source of an air under pressure, both controlled by a valve which alternately applies suction to secure and pressure to release the mold from the chuck.

For mounting the dies, there is disclosed at 1 a rotatable turret having trunnions 52 which are journaled in supports 53 secured to columns 54. The turret has a multiple of faces and each face 55 has a large central opening to permit vertical displacement of the die base 56. The die is attached to the base by screws 57 and said base is threaded into an adjusting ring 58 concentric with the opening and rotatably supported by members 59. This arrangement simplifies vertical adjustment of the die which can be made whilst the machine is in operation.

The die 2 is for making hollow ware and 3 and 4 for making flat ware. When changing from flat to hollow ware and vice versa, the chucks may be subject to exchange, although this is not always necessary as in the case where the only difference between molds is in the contour or design of the molding surface. I prefer that production be arranged to enable molds fitting one set of chucks to be utilized for a maximum period. I have endeavored to make the matter of chuck replacement and adjustment as economical of time and effort as possible so as not to interrupt production unduly. The dies are quickly shifted to working position by withdrawing the indexing pin 60 from the aperture of disc 61 and rotating the turret to the desired position.

In order to secure the separation of the molding surface of the dies and the clay, thereby insuring retention of the clay by the mold, the molding surfaces of the dies are preferably rendered nonadhesive by heating the same either by steam, flame or electricity. A chambered permeable face die connected to a source of super atmosphere as per my Patent #2,079,082 may also be applied. In the case of steam, it is piped through a header 62 and branches 63 to a steam chamber in the die, there being outlet pipes 64 which convey spent fluid to a common discharge line 65. In each line 64 is a valve 66 having a closure 67 operated by a lug 67a on the crosshead. When the crosshead raises, the valve is opened, thereby venting condensate into the discharge line 65. The dies may be heated by electricity and in this case, each die is provided with a heating element 70 and connection 68. A pair of contacts 69 located adjacent the working position automatically engage contacts 68 when a die is moved into working position. Dies may be preheated by plugging in on another circuit previously to use.

As the mold and chuck are elevated, the upper surface of the hollow ware mold engages and is gripped by a rubber stripper ring 71 contoured to correspond with the beveled brim portion of the mold. Plaster does not adhere to rubber and therefore there is no accumulation thereon after successive contacts. The mold during the pressing operation is supported and reinforced externally on substantially all surfaces by rubber to prevent mold breaking.

The rubber ring 71 is fastened to a plate 71a which in turn is supported at the four corners by studs 72, being held in a depressed position by springs 73. Normally, the clay is repelled from the die, therefore, stripper ring 71 and vacuum in chuck cavity serve only under abnormal die surface conditions.

After the clay charge has been preformed, the mold is lowered and deposited on its brim in a transfer mechanism 74 which comprises a pair of spaced parallel bars having mold seats 73a which are divided or opened through the center longitudinally of the transfer mechanism. The seats are divided to straddle the pedestal when reciprocated. Each seat is contoured to fit a segment of the brim of the mold and is of heavy rubber construction to avoid injuring the brims of the mold.

It will be noted that in the intermittently actuated unidirectionally travelled flexible mold carrier 102 of Fig. 5, the mold seats are not divided.

The press may be provided with an automatic clay feeder (see my co-pending application Serial No. 291,158) which segregates charges of clay and deposits said charges concentric on the molds, in which case the transfer 74 would operate in the transportation of empty molds to the feeding position and then to the press and jigger positions. Furthermore, the press may be combined in a single unitary installation with an automatic profiling mechanism which may or may not include a feeder and/or transfer.

In Figs. 3 and 4 is illustrated an arrangement for quickly exchanging individual dies by hand. A vertical machine frame member 75 and an apertured horizontal turret or member 76 on which is pivotally mounted a wedge shaped latch 77 having an arcuate slot 78 enlarged at one end over the aperture. This die 79 has an upwardly projecting adjustable central attaching stud 80 circumferential ledge 81 just below the streamlined head. The stud is moved vertically into the enlarged end of the slot until the groove 81 registers with the tail of the slot whereupon the latch is forced home by the spring 81a thereby securing the die in position. The die may be quickly and easily removed by reversing the procedure. The slightly inclined upper surface of the narrow portion engages the ledge 81 and thus elevates and binds the die against turret face. Suitable quick fluid and electric connections can be included.

Fig. 5 shows apparatus for automatically substituting another preforming die in correct working position, after a predetermined number of pieces of one pattern has been made.

The apparatus comprises a turret 82 similar to that shown in Fig. 1 on which are mounted a plurality of dies. The turret is mounted on trunnions 83 journaled in the machine frame and is rotated by means of a four point ratchet wheel 84 keyed on the turret and a reciprocating pawl 85 operated by a pivotally mounted air cylinder 86. A locking pin 87 is moved into and out of registry with apertures in an indexing plate 88 by spring 90 and piston 90a of air cylinder 87a to intermittently lock the turret in working position. Conduits 89 through valve 89a conduct compressed air to the cylinders. An operating lever 94 provided with a return spring 95 controls the opening and closing of the valve which is operated either by trips 96, Fig. 5, removably secured to various mold carriers 97 carried by an endless chain conveyor, said conveyor being preferably as disclosed in my Patent #1,856,498 or by the spider 103 of Geneva mechanism which determines valve operation intervals.

When lever 94 is shifted by trip 96, air enters below piston 90a to withdraw index pin 87 and also above piston 86a to rotate turret 82 one station, and when lever 94 slips off trip 96, air escapes from both cylinders to permit spring 90 to first extend index pin and then spring 86b to retract the pawl 85. Relative operation precedence is established through adjustable valve 91 or adjustable valves in the fluid lines and/or relative area of pistons or resistance of springs 86b and 90.

Conveyor 102 is an endless chain preferably travelling for a portion of its length in a dryer and has a plurality of spaced open bottom mold carriers, which are preferably surfaced with a shock absorbent or cushioning material such as rubber or "spauldite" to minimize abrasive action between the molds and the otherwise metallic seats of the mold carriers, in which are disposed, in the order desired, the various molds in which the production is made. Cam 101 on shaft 98 raises and lowers crosshead 99 and chuck 100. The conveyor 102 is synchronized with the operation of the cam so that it will advance a distance equal to the center to center spacing between carriers when the chuck is in the lowermost position, this being in accordance with the teachings of my United States Patent #1,856,498.

A Geneva spider 103 mounted on shaft 104 and having radial slots 105 is intermittently rotated by a crank member 106 mounted on shaft 107 and driven from shaft 98 by chain 108 and sprockets 109. A roll 110 pivotally connected to the end of rotary member 106 intermittently enters slots 105 to thereby rotate the Geneva one spacing during a portion of each revolution of the main shaft 98.

The Geneva has a ring of spaced holes 111 equal to the number of slots 105 and removable pins 112 are positioned therein for operating the valve lever 94. The number of radial slots lying between pins determines the number of pieces of ware produced between tool changes. If desired, all pins may be removed and the press operated exclusively on one shape. In other words, the movement of the pins 112 is synchronous with the movement of the molds on conveyor 102 and into fabricating position.

Fig. 7 illustrates how the valve may be operated by means of the mold carrier 102. A striker arm 96 is adjustably secured to a mold tray containing the initial mold or molds signifying a change in production and requiring a change of dies. The arm 96 will engage and throw the valve lever 94 prior to the mold coming to rest under die 2, thereby setting the exchange mechanism in operation.

Fig. 8 discloses an arrangement wherein the dies may be mounted for movement in a horizontal plane into and out of the working position. The apparatus consists of a turret 115 mounted on a vertical shaft 113 and may be rotated by hand or mechanically as shown in Fig. 7. The chuck 114 indicates the working position.

By virtue of the tool shifting mechanism herein and the control apparatus therefor, it is possible to shift the proper tool into fabricating position automatically incident to the approach of a predetermined mold to the fabricating position. The control mechanism not only synchronizes with the main shaft of the fabricating machine but also with the mold.

Any number of pieces of ware of a particular shape may be made and the production changed to another shape without manual intervention, unless it is necessary to change the chuck and this may be obviated by mounting the chucks on a turret and revolving said turret in the same fashion as the die turret is revolved.

Having thus described my invention, what I claim is:

1. In apparatus for manufacturing pottery ware, the combination of means for forming pottery ware and means for undersupporting plaster molds at the forming position comprising a rigid container having a molded insert of resilient material shaped to fit the bottom and sides of a mold together with means for oversupporting the mold comprising a resilient body engageable with the upper surface of the mold, said mold being gripped in a resilient embrace, top, bottom and sides incident to the performance of the fabricating operation whereby breakage of the mold is prevented by any vibratory action imparted to various parts thereof during said operation.

2. In apparatus for manufacturing pottery ware, means for supporting plaster molds incident to the fabricating of ware engageable with the top, bottom and sides of the mold including a cushioning material capable of conforming temporarily thereto to absorb any vibration imparted to all parts thereof during operation of the apparatus.

3. A pottery machine having a number of pressing dies exchangeable at a given forming position and means enabling the rapid exchange of dies at said position comprising indexing means rotatable about an axis, a mold chuck and a chuck support having interfitting connections with the mold chuck fully engageable or releasable by partial rotation of the chuck and holder relative to one another.

4. The combination with a pressing die for pressing out clay on the molding surface of a plaster mold and a registering mold chuck for receiving and supporting molds on which clay is pressed out by the die of a mold transporting and indexing means having several mold seats from which molds are lifted therefrom and replaced thereon by the chuck, said mold seats being composed, at least in part, of a cushioning material such as rubber or the like on which the molds rest when supported thereby.

5. The combination with a forming tool for forming pottery ware on the molding surface of a plaster pottery mold and a registering mold chuck for supporting molds whilst clay is being formed thereon of a support for the mold chuck enabling quick exchange and replacement of mold chucks comprising a hollow pedestal and a member having a sliding fit therein from which the member may be pulled, said member being composed of parts that are adjustable to vary the vertical position of the mold chuck above the pedestal.

6. The combination with mold indexing means for presenting plaster molds at a forming position of a die support, manually rotatable about a horizontal axis, mounted above said mold indexing means, a plurality of non-adhesive dies for making ware of different size or type detachably secured to said support, and indexing means for locating and locking selected dies at the forming position.

7. A pottery machine having a plurality of ware fabricating tools arranged to be alternately substituted for one another at a given fabricating position, mold indexing means, and fluid operated mechanism controlled by the mold indexing means for automatically shifting the tools into and out of the fabricating position.

8. The combination with mold indexing means provided with a plurality of mold seats of a mold chuck for lifting molds off the seats and raising same to a forming position, a rotatable press die support located above the chuck, a plurality of dies mounted on said support, and fluid operated means for rotating said support to bring different dies into registration with various molds, and control means therefor associated with said mold indexing means.

WILLIAM J. MILLER.